A. ROGERS.
Apparatus for Evaporating and Cooling Liquids.

No. 149,157. Patented March 31, 1874.

WITNESSES:
A. W. Almqvist
C. Sedgwick

INVENTOR:
A. Rogers
BY
[signature]
ATTORNEYS.

UNITED STATES PATENT OFFICE.

ARCHIBALD ROGERS, OF HYDE PARK, NEW YORK.

IMPROVEMENT IN APPARATUS FOR EVAPORATING AND COOLING LIQUIDS.

Specification forming part of Letters Patent No. 149,157, dated March 31, 1874; application filed March 7, 1874.

*To all whom it may concern:*

Figure 1:
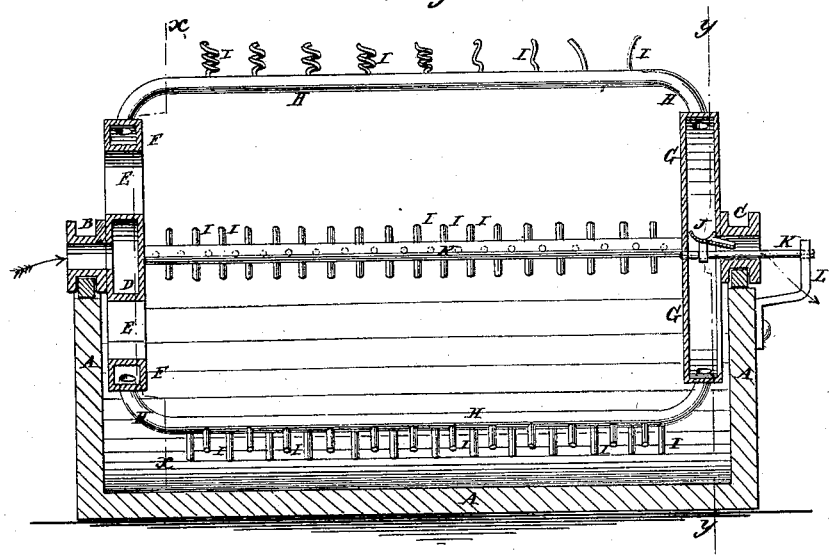
Figure 2:
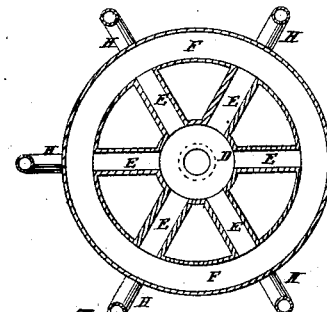
Figure 3:
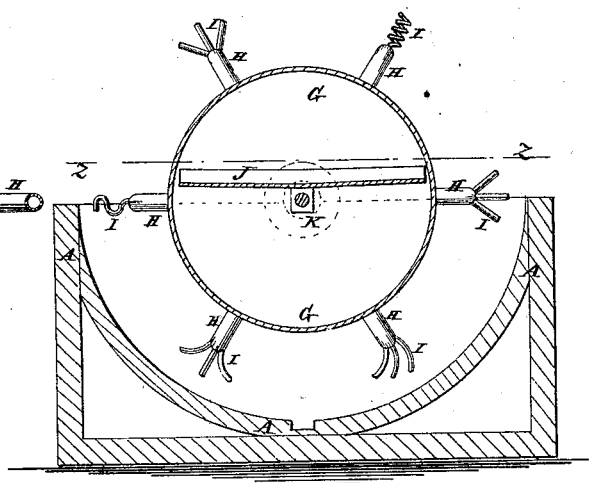
Figure 5:
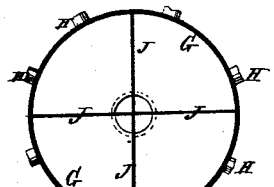
Figure 4:
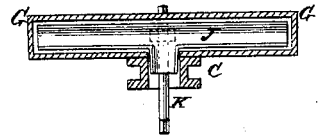

Be it known that I, ARCHIBALD ROGERS, of Hyde Park, in the county of Dutchess and State of New York, have invented a new and useful Improvement in Evaporator and Cooler, of which the following is a specification:

Figure 1 is a vertical longitudinal section of my improved machine. Fig. 2 is a detail cross-section of the same taken through the line $x$ $x$, Fig. 1. Fig. 3 is a detail cross-section of the same taken through the line $y$ $y$, Fig. 1. Fig. 4 is a detail section taken through the line $z$ $z$, Fig. 3. Fig. 5 is the same section as Fig. 3, but showing a modification of the device for carrying off the water of condensation.

Similar letters of reference indicate corresponding parts.

My invention has for its object to furnish an improved device for evaporating liquids which shall be so constructed as to bring a very large heated surface in contact with the liquid to be evaporated, and which may be used with equal facility as a cooler for cooling liquids. The invention consists in the pipes provided with small radial pipes, in combination with the hollow drums and the hollow hubs; and in the conductor-spout, whether made in one piece or in radial parts, in combination with the hollow drum and the hollow hub, to receive the water of condensation from the pipes, as hereinafter fully described.

A represents the vat, into which the liquid is placed to be evaporated, and which is made semi-cylindrical in form. In the middle part of the edges of the ends of the vat A are formed half-bearings, in which the hubs B C revolve, which hubs are made hollow, and the outer ends of one or both should project sufficiently to receive the driving-belt. With the inner end of the inlet-hub B is connected a small hollow drum, D, from which six, more or less, radial pipes, E, lead to the hollow ring F, as shown in Figs. 1 and 2. The device D E F may be made in the form of a single hollow drum, if desired. With the inner end of the outlet-hub C is connected a hollow drum, G, of a little less diameter than the hollow ring F. H is a series of pipes, the main parts of which are made parallel with the axes of the hubs B C, and the ends of which are bent inward, and are connected at one end with the hollow ring F, and at the other end with the hollow drum G. With this construction the bodies of the pipes H will sweep through a larger circle than the rims of the ring F and drum G. The pipes H will have a slight descent toward the drum G, so that the water of condensation may flow out freely. With the bodies of the pipes H are connected, one, two, three, or more rows of small radial pipes, I, the outer ends of which are closed, and which may be straight, curved, or spiral, as may be desired. In the hollow drum G is placed a spout, J, to receive the water of condensation and discharge it through the hollow drum G. The spout J may be a single straight spout, crossing the drum G from side to side, as shown in Figs. 1, 3, and 4, or it may be made in four radial parts, meeting each other at right angles in the center of the said drum, as shown in Fig. 5. In the first case the spout must be stationary, and attached to a stationary rod, K, passing in through the hollow hub C, and being supported by a bracket, L, attached to the end of the vat A. In the latter case the spout J must be attached to the drum G, and be carried around by and with said drum. The steam is introduced through the hollow hub B, passes through the pipes H I, and escapes through the hollow hub C. The water of condensation, as it forms, flows out of the pipes H into the drum G, where it is received upon the spout J and flows out through the hub C. By shutting off the steam and forcing cold air or water through the device it may be used as a cooler. The large amount of surface furnished by the pipes H I makes it very effective in either capacity.

Having thus described my invention, I claim as new and desire to secure by Letters Patent—

1. The pipes H, provided with small radial pipes I, in combination with the hollow drums D, E, F, and G, and the hollow hubs B C, substantially as herein shown and described.

2. The conductor-spout J, whether made in one piece or in radial parts, in combination with the hollow drum G and hollow hub C, to receive the water of condensation from the pipes H, substantially as herein shown and described.

ARCHD. ROGERS.

Witnesses:
 JOHN HACKETT,
 E. P. ROGERS.